United States Patent
Piorkowski

(10) Patent No.: US 9,907,325 B2
(45) Date of Patent: Mar. 6, 2018

(54) ENCAPSULATED WEIGHTING AGENTS FOR BEVERAGE EMULSIONS

(71) Applicant: Kraft Foods Group Brands LLC, Northfield, IL (US)

(72) Inventor: Daniel T. Piorkowski, Fairfield, CT (US)

(73) Assignee: Kraft Foods Group Brands LLC, Chicago, IL (US)

( * ) Notice: Subject to any disclaimer, the term of this patent is extended or adjusted under 35 U.S.C. 154(b) by 80 days.

(21) Appl. No.: 14/641,081

(22) Filed: Mar. 6, 2015

(65) Prior Publication Data

US 2016/0255870 A1 Sep. 8, 2016

(51) Int. Cl.
  *A23L 2/56* (2006.01)
  *A23L 2/62* (2006.01)

(52) U.S. Cl.
  CPC .. *A23L 2/56* (2013.01); *A23L 2/62* (2013.01)

(58) Field of Classification Search
  None
  See application file for complete search history.

(56) References Cited

U.S. PATENT DOCUMENTS

| | | | |
|---|---|---|---|
| 3,023,106 A | 2/1962 | Common | |
| 3,658,522 A | 4/1972 | Endo et al. | |
| 3,658,552 A | 4/1972 | Carlson et al. | |
| 4,187,326 A | 2/1980 | Serafino et al. | |
| 4,349,577 A | 9/1982 | Tessler | |
| 4,619,833 A | 10/1986 | Anderson | |
| 5,571,334 A | 11/1996 | Dunn et al. | |
| 5,624,698 A | 4/1997 | Dake et al. | |
| 6,608,017 B1 * | 8/2003 | Dihora | C11D 3/124 424/490 |
| 6,616,955 B2 | 9/2003 | Nunes et al. | |
| 6,759,073 B2 | 7/2004 | Heisey et al. | |
| 8,142,831 B2 | 3/2012 | Van Lengerich et al. | |
| 2003/0021874 A1 | 1/2003 | Nunes et al. | |
| 2004/0062845 A1 | 4/2004 | Krawczyk et al. | |
| 2009/0162483 A1 | 6/2009 | Constantine et al. | |
| 2011/0159141 A1 | 6/2011 | Luo et al. | |
| 2011/0236558 A1 * | 9/2011 | Tran | A23L 29/10 426/602 |
| 2013/0108695 A1 | 5/2013 | Grenier et al. | |
| 2015/0004238 A1 * | 1/2015 | Khangaonkar | A61K 9/107 424/489 |
| 2015/0050413 A1 * | 2/2015 | Sepcic | A23C 9/00 426/580 |

\* cited by examiner

*Primary Examiner* — Tamra L Dicus

(74) *Attorney, Agent, or Firm* — Fitch, Even, Tabin & Flannery LLP

(57) ABSTRACT

Disclosed are emulsions including an aqueous phase with an emulsifier dissolved in the aqueous phase, an oil phase including oil droplets, and a solid weighting agent encapsulated in the oil droplets. The ratio of the solid weighting agent to the oil phase in the emulsion may be from about 1:5 to about 1:2000. The emulsions may be used with ready-to-drink and liquid concentrate beverages. Methods for making such emulsions are also disclosed.

10 Claims, No Drawings

ENCAPSULATED WEIGHTING AGENTS FOR BEVERAGE EMULSIONS

FIELD

The field relates to weighting agents, and more specifically, to oil-encapsulated weighting agents for beverage emulsions and methods for producing the same.

BACKGROUND

Soft drinks are some of the most widely consumed beverages. Flavor oils, such as orange, lemon and peppermint oils, are often used in drinkable beverages as flavoring agents, since they contain volatile constituents with characteristic aroma profiles. Soft drinks may also contain a variety of hydrophobic components, such as clouding agents, weighting agents, nutraceuticals, oil-soluble vitamins, and oil-soluble antimicrobials. Due to the non-polar character of flavor oils and other hydrophobic ingredients, such ingredients are not typically dispersed directly into an aqueous phase because they would rapidly coalesce and separate through gravitational forces leading to a layer of oil on top of the product. Instead, these ingredients are usually converted into a colloidal dispersion consisting of flavor molecules encapsulated within small particles suspended within an aqueous medium, i.e., an emulsion.

The emulsions used in the beverage industry are typically divided into two groups: flavor emulsions and cloud emulsions. Flavor emulsions contain lipophilic compounds that are primarily present to provide taste and aroma to a beverage product (such as lemon, lime, or orange oils). On the other hand, cloud emulsions are used to provide specific optical properties to certain beverage products, i.e., to increase their turbidity ("cloudiness"). Cloud emulsions are typically prepared using an oil phase that is highly water-insoluble and that is not prone to chemical degradation, such as flavorless vegetable oils. In addition, the size of the droplets within cloud emulsions is typically designed so that the droplets are dimensioned such that strong light scattering occurs, but not too large to undergo gravitational separation. Cloud emulsions are often added to beverages that only contain a relatively low percentage of juice and provide a desirable cloudy appearance that hides sedimentation and ringing.

Generally, an emulsion consists of at least two immiscible liquids (usually oil and water), with one of the liquids being dispersed as small spherical droplets in the other. Emulsions are classified according to the relative spatial organization of the oil and water phases. A system that contains oil droplets dispersed within water is called an oil-in-water (O/W) emulsion, whereas a system that contains water droplets dispersed in oil is called a water-in-oil (W/O) emulsion. Currently, almost all of the emulsions used in the beverage industry are of the O/W type, although there may be advantages to using other emulsion types for some applications.

Beverage emulsions experience a range of environmental stresses during their manufacture, transport, storage, and utilization that may reduce their shelf lives. Examples include mechanical forces (e.g., stirring, flow through a pipe, centrifugation, vibrations, and pouring); temperature variations (e.g., freezing, chilling, warming, pasteurization, and sterilization); exposure to light (e.g., natural or artificial visible or ultraviolet waves); exposure to oxygen; variations in solution properties (e.g., pH and mineral composition of water). Exposure to these environmental stresses may promote emulsion instability through a variety of physicochemical mechanisms including loss of ingredient functionality (e.g., changes in solubility, surface activity, or stabilization capacity); acceleration of chemical degradation reactions (e.g., oxidation, polymerization, or hydrolysis); and acceleration of physical instability mechanisms, (e.g., flocculation, coalescence or Ostwald ripening).

Generally, emulsions are thermodynamically unstable systems that tend to break down over time due to a variety of physicochemical mechanisms, including gravitational separation, flocculation, coalescence and Ostwald ripening. Such instability mechanisms lead to a change in the structural organization of the various components within the system and can lead to detrimental changes in the physical stability of the beverage emulsion. Gravitational separation is one of the most common forms of physical instability in commercial beverage emulsions and may be in the form of creaming or sedimentation, depending on the relative densities of the oil droplets and the surrounding aqueous phase.

One such problem in beverage emulsions is creaming, which is the upward movement of droplets when they have a lower density than the aqueous phase, while sedimentation is the downwards movement of droplets when they have a higher density than the aqueous phase. Creaming is more prevalent since the oil phases used in beverage emulsions consist primarily of triacylglycerol and/or flavor oils, which have lower densities than water. A beverage emulsion may be prone to sedimentation if it contains very small oil droplets covered by relatively thick and dense interfacial layers.

Another problem that may occur in beverage emulsions is "ringing," which is the accumulation of a visible ring of oil droplets on the top of a product, which may be visually displeasing to some consumers. The "ringing" effect is due to droplet creaming, which may have occurred because a population of droplets in the initial emulsion was too large, or because some droplet growth occurred during storage, e.g., due to flocculation, coalescence, or Ostwald ripening. Ostwald ripening is the process where the size of the oil droplets in an oil-in-water emulsion increases over time due to diffusion of oil molecules from small to large droplets through the intervening aqueous phase. The susceptibility of a beverage emulsion to Ostwald ripening is mainly determined by the solubility of the oil phase in the aqueous phase. Specifically, the higher the solubility of the oil phase in the aqueous phase, the more unstable the emulsion.

Generally, oil density determines the rate of particle creaming or sedimentation within emulsions. Specifically, the greater the density contrast between the droplets and surrounding fluid, the faster the rate of gravitational separation. The stability of a beverage emulsion to gravitational separation can therefore be improved by ensuring that the density of the oil droplets is similar to that of the surrounding aqueous phase. The densities of flavor oils and vegetable oils are typically considerably lower than those of water and aqueous sugar solutions and for that reason, droplets containing flavor oils and vegetable oils tend to move upward during storage leading to creaming, which is undesirable. The creaming rate in an emulsion may be reduced by decreasing the density contrast between the oil droplets and the surrounding aqueous phase.

Weighting agents are additives incorporated into the oil phase of certain types of beverage emulsions to inhibit gravitational separation of the oil droplets. The creaming and ringing issues in beverage emulsions may be reduced by decreasing the density contrast between the oil droplets and the surrounding aqueous phase. Weighting agents, which are typically hydrophobic components that have a density considerably greater than water, may be used to increase the density of the oil phase so that it matches that of the aqueous phase. Notably, beverage emulsions are one of the few products where these weighting agents can be used to reduce the creaming rate, because the oil phase content is typically very low (<0.1%).

A number of different weighting agents are known for utilization within commercial beverage products. Such weighting agents include brominated vegetable oil (BVO), sucrose acetate isobutyrate (SAIB), ester gum, and dammar gum. There are a number of different factors that will determine which of these different components is suitable for application within a specific beverage product. There are also limits on the amount of each type of weighting agent that may be legally used in beverages. There are also differences in the "labelfriendliness" of different weighting agents as some weighting agents may be perceived by the consumers as "more natural" than others.

BVO and ester gum are the most commonly used weighting agents in beverage emulsions. However, the amount of weighting agents that can be found in the final product is often regulated. For example, the use of BVO and ester gums is often limited to 15 and 100 ppm per serving, respectively. Such a low concentration of allowable weighting agents restricts the type of products that BVO and ester gum may be used in.

Brominated vegetable oil (BVO) is made when bromine is added to the double bonds of the triacylglycerol molecules in corn, soybean, cotton seed, or olive oil. In some cases, BVO is permitted for use at a level not exceeding 15 ppm per serving. However, there has recently been consumer concern about the presence of BVO in soft drinks and even though BVO is still permitted for use in the United States, it is undesired by some consumers.

Ester gum is a hydrophobic polymer made when glycerol is esterified to gum rosin. It is normally supplied as a crystalline solid that can be incorporated into the oil phase. Ester gum may be considered by some to be an artificial food ingredient due to the esterification step used in its preparation, but it is derived from natural components (gum rosin) and non-animal glycerol, and in some cases is acceptable for use at a level not exceeding 100 ppm per serving. Ester gum performs similarly to BVO, but a greater concentration of ester gum has to be added to the oil phase in order to raise the density. Dammar gum is a natural weighting agent that is isolated from an exudate of Caesalpinaceae and Dipterocarpaceae shrubs. Dammar gum is approved for use in some countries, but does not have the generally regarded as safe (GRAS) status in the United States.

Sucrose acetate isobutyrate (SAIB) is a synthetic weighting agent produced by the esterification of sucrose with acetic and isobutyric anhydrides. SAIB is usually supplied in the form of a high viscosity transparent liquid that can be mixed with the oil phase prior to homogenization. The use of SAIB in beverages is currently permitted in amounts up to 300 ppm per serving in some cases.

There are several drawbacks with conventional weighting agents such as SAIB, BVO, and GEWR. First, use of SAIB, BVO, and GEWR in beverages can be limited to 300, 15, and 100 ppm per serving, respectively, in some instances. Also, SAIB, BVO, and GEWR are ingredients that may be undesired by some consumers. In addition, the densities of SAIB, BVO, and GEWR are 1.146 g/ml, 1.24-1.33 g/ml, and 1.08 g/ml, respectively, which may be too low to properly weight an oil droplet. For example, sugar-sweetened ready-to-drink or liquid concentrated beverages can have aqueous-phase densities ranging from about 1.05 to about 1.25 g/ml and a flavor/cloud oil-phase density of about 0.9 g/ml. Due to the above-mentioned limits on use and densities of SAIB, BVO, and GEWR, these weighting agents may not weight the oil phase to the aqueous phase's density, thereby causing the beverage to undesirably form a cream layer over its shelf-life.

SUMMARY

Disclosed are oil-in-water emulsions, compositions, and/or ingredients for drinkable beverages that include a weighting agent encapsulated in oil droplets, beverages including such ingredients, and methods of preparation of such emulsions.

In one approach, an emulsion for drinkable beverages includes a continuous aqueous phase with an emulsifier dissolved therein and an oil phase including oil droplets dispersed in the continuous aqueous phase. The emulsion also includes a solid, oil-insoluble weighting agent encapsulated in the oil droplets such that the ratio of the solid weighting agent to the oil phase in the emulsion is from about 1:5 to about 1:2000.

In another approach, a beverage is described that includes an emulsion ingredient or component comprising a continuous aqueous phase including an emulsifier dissolved therein and an oil phase including oil droplets dispersed in the continuous aqueous phase. The beverage further includes a solid, oil-insoluble weighting agent encapsulated in the oil droplets and a ratio of the solid weighting agent to the oil phase in the emulsion is from about 1:5 to about 1:2000. The emulsion component or ingredient may be a flavor oil, an aroma, clouding oil (e.g. vegetable oil), flavor oil solvent (e.g. medium chain triglycerides) and/or combinations thereof for the beverage.

The emulsion ingredient, component, or composition may be an oil-in-water emulsion with an average size of the oil droplets encapsulating the solid, oil-insoluble weight agent greater than about 100 nm. The oil droplets may have an average size of about 100 nm to about 1500 nm.

In one form, the ratio of the solid weighting agent to the oil phase may be from about 1:16.5 to about 1:1,650. The solid weighting agent may be present in the emulsion at about 1:165 to about 1:16,500 percent by weight of an emulsion that may have up to 90% water. The solid weighting agent may have a density from about 1.0 g/ml to about 6.0 g/ml and in other cases, about 1.25 g/ml to about 5 g/ml, and may be titanium dioxide.

The oil phase may include water insoluble lipids selected from the group consisting of castor oil, terpene hydrocarbons, flavor oils such as alcohols, ketones, aldehydes, lactones, ethers, esters, sulfur compounds, furanones, terpenoids, oil soluble vitamins or nutraceuticals such as Vitamin A, D, E, K, or the like, fatty acids, poly-unsaturated fatty acids, triglycerides and triglyceride derivatives, antioxidants, colorants, vegetable oils, and combinations thereof.

In an approach, the emulsifier has a molecular weight no less than about 50,000 Daltons, in some cases, about 100,000 to about 800,000 Daltons, and in other cases, about 400,000 to about 600,000 Daltons. The emulsifier may be selected from the group consisting of gum acacia, modified food starch, modified gum acacia, corn fiber gum, gum tragacanth, gum karaya, gum ghatti, and combinations thereof.

The creaming rate of the emulsion may be about 0 to about 5 mm/day, in some cases about 0 to about 1 mm/day, and in some cases, about 0 to about 0.75 mm/day at ambient storage. The emulsion may have an instability index of about to about 0.1 to 0.4, with 0 being no creaming at all and 1 being complete creaming.

In one approach, a method of making an emulsion for drinkable beverages includes: providing an oil including oil droplets with an average size of greater than 100 nm; adding a solid weighting agent to the oil at a ratio of the solid weighting agent to the oil of about 1:5 to about 1:2000 and stirring the solid weighting agent and the oil to provide a blend of the solid weighting agent and the oil where the solid weighting agent is dispersed in the oil droplets; providing an aqueous solution including an emulsifier dissolved in the aqueous solution; and adding the blend of the solid weighting agent and the oil to the aqueous solution to form an oil-in-water emulsion.

The method may further include homogenizing the oil-in-water emulsion after the adding of the blend of the oil and the solid weighting agent encapsulated in the oil droplets to the aqueous solution to form the oil-in-water emulsion.

DETAILED DESCRIPTION

The products and methods disclosed herein relate to oil-in-water emulsions suitable as ingredients or components for drinkable beverages where the emulsions include a weighting agent encapsulated in oil droplets to render the emulsion more stable and reduce creaming rates. For example, such emulsions and such beverages or compositions including the emulsions herein, have creaming rates that are the same or lower than the creaming rates of beverages or compositions including prior, conventional weighting agents (e.g., SAIB, BVO, and GEWR), even when the weighting agents as described herein are included in the beverages or compositions in a fraction of the amounts of the conventional weighting agents included in prior beverages or compositions. For example, in some approaches, the solid encapsulated weighting agents herein are used in levels over 100 times lower than conventional weighting agents and achieve equal or better protection against instability and creaming. As used herein, emulsions, emulsion compositions, emulsion components, and emulsion ingredients are used interchangeably and refer to a emulsified beverage ingredient that can be included in ready-to-drink or concentrated beverages to provide flavors, aromas, nutraceuticals such as oil-soluble vitamins, clouding oils and the like.

In other approaches, the beverages and emulsions described herein are substantially free of SAIB, BVO, and GEWR. "Substantially free" of an ingredient (such as SAIB, BVO, and/or GEWR) as used herein generally means less than about 0.005% of the ingredient in some approaches and less than about 0.001% of the ingredient in other approaches. In one approach, the beverages and emulsions described herein are free of SAIB, BVO, and GEWR. "Free" of an ingredient (such as SAIB, BVO, and/or GEWR) as used herein means that the ingredient is completely absent from the beverage or emulsion.

As used herein, the terms "encapsulated" and "encapsulation" refer to composite structures (and formation of such composite structures), where a solid (e.g., a weighting agent such as titanium dioxide or the like) forms a core surrounded by a shell layer formed by one or more oil droplets. In one form, an emulsion may include an encapsulated weighting agent in the form of one or more oil droplets each including one or more particles of titanium dioxide. The encapsulation of the weighting agent particles as described herein advantageously permits the weighting agents to decrease the density contrast between the oil phase and the continuous aqueous phase in the beverage ingredient, providing for a uniform distribution of the oil droplets in the emulsion and restricting the undesirable sedimentation or creaming of the oil particles. The emulsions as described herein may be used, for example, with ready-to-drink beverages and liquid concentrate beverages.

Turning to more of the specifics, the emulsions herein may be oil-in-water emulsions. In one approach, an emulsion for drinkable beverages includes a continuous aqueous phase with an emulsifier dissolved therein and an oil phase including oil droplets encapsulating the solid weighting agent, dispersed in the continuous aqueous phase. The emulsion may be formed separately from the ready-to-drink beverage products. Alternatively, the ready-to-drink beverage product may incorporate the emulsion. As used herein, the term "emulsion" will be understood to mean an oil-in-water emulsion with the continuous phase of the emulsion being an aqueous, water-based phase, and an oil phase of oil droplets encapsulating a solid weighting agent with the droplet size being greater than about 100 nm.

The oil phase of the oil in water emulsion may include one or more water insoluble lipids, including glycerolipids, phenol lipids, mono, di, or triglycerides, water-insoluble fatty acids, or the like. In one approach, the lipid may be castor oil. Castor oil is a vegetable oil obtained by pressing the seeds of the castor oil plant and is commonly used in the food industry in food additives such as flavorings and candy as a preservative.

In another approach, the water insoluble lipid may be one or more terpene hydrocarbons. Terpenes are organic compounds produced by plants and are known to be primary constituents of essential oils of various types of plants and flowers. Terpenes are commonly used as flavor additives for food products. Some suitable terpene hydrocarbons suitable for use as a water insoluble lipid for the emulsions described herein include citral, limonene, citronellal, geraniol, linalool, and combinations thereof.

In yet another approach, the water insoluble lipid may be one or more medium chain triglycerides. Medium chain triglycerides will be understood to mean fatty acid esters of glycerol that have from 6 to 12 carbon atoms and include a backbone of glycerol and three fatty acids. In still another approach, the water insoluble lipid may be one or more long chain triglycerides. Long chain triglycerides will be understood to mean fatty acid esters of glycerol that have more than 12 carbon atoms and include a backbone of glycerol and three fatty acids.

Emulsions may be thermodynamically unstable systems that may be made kinetically stable for a reasonable period of time by including substances known as stabilizers, e.g., emulsifiers, weighting agents, ripening inhibitors, or texture modifiers. In one approach, the emulsion may include a solid weighting agent encapsulated in the oil droplets dispersed throughout the continuous aqueous phase. The ratio of the total weight of the solid weighting agent to the total weight of the oil present in the emulsion may be from about 1:5 to about 1:2000 in one approach, from about 1:16.5 to about 1:16,500 in another approach, and from about 1:100 to about 1:2000 in yet another approach. The high ratio of the total weight of the oil to the total weight of the solid weighting agent advantageously permits the weighting agent to be encapsulated in the oil droplets, thereby advantageously decreasing the density contrast between the oil droplets and the surrounding aqueous phase and slowing down the creaming rate of the resulting emulsion. Conversely, when a low ratio (e.g., from 1:1 to about 10:1) of the total weight of the oil to the total weight of the weighting agent is used, the oil droplets may not encapsulate the titanium dioxide and the oil particles are likely to sediment out of the emulsion.

The weighting agent may be present in the emulsion at about 0.05% to about 33% by total weight of the oil and titanium dioxide phase in the emulsion. In other approaches, the emulsion may include about 0.1% to about 25% of weighting agent by total weight of the oil and titanium dioxide phase of the emulsion in one approach, about 0.15% to about 20% weighting agent by total weight of the oil and titanium dioxide phase of the emulsion in another approach, and about 0.2% to about 7% weighting agent by total weight of the oil and titanium dioxide phase of the emulsion in yet another approach. The solid weighting agent particles may have a size of about 100 nm to about 5000 nm in one approach, about 150 nm to about 2500 nm in another approach, about 150 nm to about 2500 nm in another approach, about 200 nm to about 1200 nm in another approach, about 300 to about 1000 in another approach, and about 400 nm to about 600 nm in yet another approach.

The solid weighting agent for use with the emulsions as described herein may have a density from about 2 g/ml to about 10 g/ml in one approach, about 3 g/ml to about 7 g/ml in another approach, and about 4 g/ml to about 5 g/ml in yet another approach. As discussed above, the densities of conventional weighting agents such as SAIB, BVO, and GEWR are 1.146 g/ml, 1.24-1.33 g/ml, and 1.08 g/ml, respectively, and sugar-sweetened, ready-to-drink or liquid concentrated beverages may have aqueous-phase densities ranging from about 1.05 to about 1.25 g/ml and a flavor/cloud oil-phase density of about 0.9 g/ml. Without wishing to be limited to theory, the densities of conventional weighting agents such as SAIB, BVO, and GEWR may be too low to properly weight an oil droplets in the emulsions, while the densities of the weighting agents as described herein, being about 4 to about 8 times higher than the densities of the conventional weighting agents, may advantageously provide for a proper weighting of the oil droplets in the emulsions described herein. More specifically, while the densities of flavor oils and vegetable oils are considerably lower than those of water and aqueous sugar solutions, the weighting agents as described herein advantageously increase the density of the oil phase so that it substantially matches the density of the aqueous phase.

The emulsion may include a weighting agent in the form of an oxide of a transition metal. In one approach, the weighting agent may be titanium dioxide. Titanium dioxide is a white pigment that is commonly used in foods and beverages but not in a manner effective for a weighting agent for beverage emulsions. Titanium dioxide has been listed as safe for consumption by the U.S. Food and Drug Administration for a long time. Titanium dioxide a density of 4.23 g/ml, is not miscible with oil, and its solubility in water is negligible.

It will be appreciated that transition metal oxides other than titanium dioxide that are classified as safe for human consumption may be used as weighting agents encapsulated in the oil particles of the emulsions described herein.

Without wishing to be limited by theory, the high density of titanium dioxide permits titanium dioxide to be advantageously encapsulated in oil droplets to function as weighting agents at a fraction (e.g., up to 200 times less, and in some cases, about 100 to about 200 times less) of the levels at which conventional weighting agents (e.g., SAIB, BVO, and GEWR) are used in order to achieve the desired weighting of the oil particles. Further, without wishing to be limited by theory, the high density of titanium dioxide permits titanium dioxide to effectively act as a weighting agent for oil particles in some emulsions that are used in high-density beverage applications such as caloric beverages or concentrated beverages (caloric and non-caloric) with densities greater than 1.0 g/ml and more specifically, those with a density over 1.05 g/ml and over 1.10 g/ml, where SAIB, BVO, and GEWR are not effective as weighting agents since the densities of such weighting agents may be less than the density of the beverage application, or the use level of such weighting agents in the emulsions is not high enough to weight the emulsion properly.

Emulsifiers are surface-active molecules that adsorb to the surface of freshly formed droplets during homogenization, forming a protective layer that prevents the droplets from aggregating. The emulsion may include an emulsifier that is a high molecular weight emulsifier. For purposes of this application, the term "high molecular weight emulsifier" will be understood to mean an emulsifier having molecular weight that exceeds 100,000 Daltons. In one form, the high molecular weight emulsifier may have a molecular weight from about 100,000 Daltons to about 1,000,000 Daltons, and in other approaches, about 300,000 Daltons to about 700,000 Daltons. Without wishing to be limited by theory, the high molecular weight emulsifiers may provide for the formation of oil droplets with a size that is sufficient to encapsulate the weighting agent (e.g., titanium dioxide) particles therein. For example, the oil droplets formed as a result of the use of a high molecular weight emulsifier may have a size that exceeds about 100 nm. In one approach, the oil droplets formed as a result of the use of a high molecular weight emulsifier may have a size of about 100 nm to about 1000 nm. Conversely, oil droplets with a size of below 100 nm may not be big enough to encapsulate a weighting such as titanium dioxide, and thus the use of a weighting agent such as titanium dioxide without an emulsifier and/or with oil droplets that are less than about 100 nm may not slow the creaming rate of such oil droplets in an emulsion.

In one approach, the emulsion may include an emulsifier such as gum acacia (also known as gum Arabic), modified food starch, or the like. Gum acacia is a natural exudate harvested from acacia trees in sub-Saharan Africa, for example Sudan, and may be the most widely used emulsifier in the beverage industry to formulate cloud and flavor emulsions. Gum acacia has a high water-solubility and a relatively low solution viscosity compared to other gums, which facilitates its application as an emulsifier. Gum acacia may have a molecular weight of about 200,000 Daltons to about 800,000 Daltons, and more specifically, about 400,000 Daltons.

The emulsifier in the emulsion may be a modified food starch. Natural (unmodified) starches have poor surface activity due to their hydrophilic glucose backbones, but starches can be chemically modified to make them effective emulsifiers by attaching non-polar chains along their backbones, and such types of modified starch are widely used as emulsifiers in the beverage industry. Like gum acacia, modified starch has a relatively low interfacial activity (compared to proteins or surfactants). In one approach, the modified food starch may be an octenyl succinate derivative of waxymaize, which consists primarily of amylopectin chemically modified to contain a side group derived from octenyl succinate anhydride (forming an ester with the food starch) that is anionic and non-polar. Such side-groups may anchor the molecule to the oil droplet surface, while the hydrophilic starch chains may protrude into the aqueous phase and protect droplets against aggregation through steric repulsion. The molecular weight of such modified starches may be from about 200,000 Daltons to about 800,000 Daltons, and more specifically, about 400,000 Daltons.

A high molecular weight emulsifier (e.g., gum acacia, modified food starch), when dissolved in the continuous aqueous phase of the emulsions as described herein, may provide for the weighting agent encapsulation in the oil droplets and advantageously significantly increase the stability of such emulsions by, for example, decreasing the creaming rate of such emulsions and enabling such emulsions to be stored for extended periods of time. For example, the creaming rate and instability index of emulsions including a high molecular weight emulsifier such as gum acacia or modified food starch and a weighting agent such as titanium dioxide encapsulated in particles of a water-insoluble lipid such as castor oil, terpene hydrocarbon, or medium chain triglyceride may be about 0 to about 5 mm/day at ambient storage and about 0 to about 2.5, respectively. Such emulsions may remain shelf-stable at room temperature or refrigeration for about 6 months to about 1 year.

Conversely, when a low molecular weight surfactant/emulsifier Polysorbate 60 (molecular weight about 1000 Daltons to about 2300 Daltons) or *Quillaja* extract (molecular weight about 1000 Daltons to about 2300 Daltons) is used instead of a high molecular weight emulsifier such as gum acacia or modified food starch, the rates of creaming of the oil droplets of the emulsion are significantly higher and the emulsion remains stable for a shorter period of time. Without wishing to be limited to theory, the ineffectiveness of low molecular weight surfactant/emulsifier Polysorbate 60 or *Quillaja* extract to slow the rate of creaming of the oil particles in the emulsion as compared to the high molecular weight emulsifier such as gum acacia or modified food starch may be due to the fact that small molecule emulsifiers such as Polysorbate 60 and *Quillaja* extract may create reduced oil droplet sizes as compared to the oil droplet sizes created by the large-molecule emulsifiers, and these reduced-size droplets may be too small to enable the weighting agent (e.g., titanium dioxide) to be encapsulated within the oil droplets. For example, in the emulsions described herein, Polysorbate 60 and *Quillaja* extract may result in oil droplets with an average size of less than 200 nm in one approach and from about 50 nm to about 100 nm in another approach. On the other hand, gum acacia and modified food starch may result in oil droplets with an average size of greater than 100 nm in one approach and from about 400 nm to about 800 nm in another approach.

The emulsifier may be present in the emulsion at about 1% to about 30% by total weight of the emulsion. For example, the emulsion may include about 5% to about 25% emulsifier by total weight of the emulsion in one approach, about 10% to about 20% emulsifier by total weight of the emulsion in another approach, and about 15% to about 20% emulsifier by total weight of the emulsion in yet another approach. Further, the emulsion may include about 10% to about 95% water by total weight of the emulsion and from about 5% to about 90% oil by total weight of the emulsion. The emulsion may include about 0.0001% to about 0.3% titanium dioxide by total weight of the emulsion. In one approach, the emulsion may include about 60% to about 85% water and about 15% to about 40% oil. The oil phase of the emulsion may include one or more flavors or aroma-generating compounds.

Turning to the details of an exemplary process of preparation of an emulsion for drinkable beverages including an encapsulated weighting agent, an exemplary emulsion may be prepared as follows:

To prepare an aqueous solution for the emulsion, an emulsifier may be added to water and the resulting solution may be stirred to dissolve the emulsifier in the water. The emulsifier may be added to the water at a ratio of about 1:2 to about 1:20. In one approach, about 1 g to about 25 g of gum acacia is added to about 75 ml of water and dissolved to provide the aqueous solution. In another approach, about 1 g to about 25 g of modified food starch is added to about 75 ml of water and dissolved to provide the aqueous solution. It will be appreciated that emulsifiers other than gum acacia and modified food starch may be used.

To prepare the encapsulated weighting agent, which is a blend of the oil and weighting agent, the weighting agent may be added to an excess of the oil. In one approach, the weighting agent may be added to the oil at room temperature, for example from about 65° F. to about 75° F. The oil may be castor oil, a terpene, a medium chain triglyceride, a long chain triglyceride, or a similar insoluble lipid. The weighting agent may be titanium dioxide or a similar transition metal oxide in solid form that is safe for human consumption. The solid weighting agent may be added to the oil at a ratio of weighting agent to oil of about 1:5 to about 1:2000. In one approach, the weighting agent may be added to the oil at a ratio of weighting agent to oil of about 1:10 to about 1:20. In another approach, the weighting agent may be added to the oil at a ratio of weighting agent to oil of about 1:100 to about 1:200.

The weighting agent and the oil may be then stirred for a time sufficient (e.g., about 1 to about 5 minutes) to provide a blend of the solid weighting agent and the oil where the solid weighting agent is dispersed in the oil. The blend including the oil and the solid weighting agent dispersed in the oil may then be added to the aqueous solution including an emulsifier dissolved therein to form an oil-in-water emulsion. In one approach, the oil-in water emulsion may be homogenized at room temperature, for example from about 65° F. to 75° F.

In one approach, the oil in the oil-in-water emulsion is a liquid at room temperature and permits for the homogenization of the emulsion. Conversely, if a lipid component that is a solid at room temperature were used, homogenization would not work with such a lipid component. Without wishing to be limited by theory, homogenization of the oil-in-water emulsion facilitates the encapsulation of the weighting agent in the oil droplets and without the homogenization, the weighting agent particles may precipitate to the bottom of the oil-in-water emulsion without being encapsulated by the oil droplets. Not wishing to be limited by theory, the temperature of homogenization may affect the stability of the oil-in-water emulsion and if the homogenization temperature is raised too high (e.g., above 200° F.), the oil-in-water emulsion may become destabilized due to the oil and water becoming miscible. Conversely, if the homogenization temperature is dropped too low (e.g., below 40° F.), the oil-in-water emulsion may become destabilized due to the crystallization of the oil.

In one approach, a scanning electron microscope ("SEM") may be used to determine whether the solid weighting agent has been encapsulated in the oil droplets. Not wishing to be limited by theory, adding the weighting agent to the oil at a large ratio of oil to weighting agent facilitates the encapsulation of the titanium dioxide in the oil droplets. For example, forming a blend of the weighting agent and oil by adding the weighting agent to the oil at a ratio of weighting agent to oil of about 1:16.5 to about 1:100 by total weight of the blend may advantageously facilitate the encapsulation of more than 50%, more than 90%, or substantially all (i.e., about 100%) of the titanium dioxide added to the oil after the emulsifier/water solution is added to the oil/weighting agent blend. Conversely, the addition of the weighting agent to the oil at a ratio of weighting agent to oil of about 1:1 to about 1:4 may be too low and will not lead to sufficient encapsulation of the titanium dioxide, undesirably leading to sedimentation of the unencapsulated titanium dioxide. Without wishing to be limited by theory, encapsulated particles of titanium dioxide advantageously weight the oil droplets and effectively slow down the creaming rates of the resulting emulsion, while unencapsulated particles of titanium dioxide that sediment out of the oil phase do not weight the oil droplets and are ineffective to slow down the creaming rates of the resulting emulsion.

Without wishing to be limited by theory, the sequential addition of the weighting agent to the oil prior to the addition of the weighting agent to the aqueous solution advantageously provides for the effective encapsulation of the weighting agent in the oil particles, leading to a decrease in the density contrast between the oil droplets and the surrounding aqueous phase, and resulting in the increase in the stability and storage times of the emulsion, as evidenced by the slowing down of the creaming rates of the emulsion. Conversely, if the weighting agent is added to the aqueous solution and subsequently combined with the oil, or if the weighting agent, the oil, and the aqueous solution including an emulsifier dissolved therein are combined simultaneously, the weighting agent does not become encapsulated in the oil particles, sediments down due to its high density, and does not slow down of the creaming rates of the emulsion and does not improve the stability of the emulsion or its shelf-life.

The emulsion components herein may be used in beverages to provide flavors, aroma, clouding oil (e.g. vegetable oil), flavor oil solvent (e.g. medium chain triglycerides), and combinations thereof for the beverage. In some approaches, beverages may be ready to drink beverages such as carbonated or uncarbonated soft drinks and/or fruit drinks, and include about 0.001% to about 0.5% of the emulsion component, and in other approaches, about 0.01% to about 0.25% percent of the emulsion component. In other approaches, the beverages may be a concentrated beverage that is reconstituted or diluted to form a drinkable beverage. In one form, the beverages herein may include the emulsions as described herein in amounts of about 1% to about 30%, and in other forms, about 3% to about 25%.

Advantages and embodiments of the emulsion including a weighting agent encapsulated in the oil particles as described herein are further illustrated by the following examples; however, the particular conditions, processing schemes, materials, and amounts thereof recited in these examples, as well as other conditions and details, should not be construed to unduly limit this method. All percentages, ratios, and parts are by weight unless otherwise indicated.

EXAMPLES

The Examples below evaluate stability of the samples using an instability index that measures the overall degree of creaming of the entire sample. For purposes of this application, the instability index measures how much an oil droplet creamed or sedimented over a period of time in an aqueous solution. An instability index of 0 indicates no creaming while an instability index of 1 indicates complete creaming.

In the examples below, the emulsions were produced with a Silverson L4R High Shear Mixer with Silverson's Fine Emulsor Stator at 70° F. The samples were homogenized at half of the L4R's capacity speed for about 5 minutes. The weighting agents (BVO, Ester Gum, SAIB, and titanium dioxide) were dissolved in oil prior to homogenization and emulsifiers were added to water prior to homogenization. Gum Acacia and Modified Food Starch were solubilized in water for 24 hours prior to mixing.

The samples in the examples below were analyzed by the dispersion analyzer LUMiSizer® (manufactured by LUM GmbH, Berlin, Germany) as emulsion concentrates. The software program of the LUMiSizer® was SEPView™ 6.1.2657.8312. Without wishing to be limited by theory, since creaming of the emulsions is due to gravity, the LUMiSizer® increases gravitational forces to accelerate creaming at various RCF values. The relative centrifugation force (RCF) will be understood to mean will be understood as amount of times the force provided by the machine is stronger than the earth's gravity.

The sample volumes were 1.5 ml and LUM 2.0 mm vials were used. The standard operating procedure used to generate the data in the examples below was as follows: speed of 2700 RPM, light factor of 1.0, temperature of 25.0° C., using 60 measurements and intervals being of 30 seconds and 60 additional measurements at intervals of 60 seconds.

Example 1

The samples included stabilized gum acacia and castor oil emulsions with different weighting agents after running 4980 seconds at approximately 970-980 g. The samples were measured by the LUMiSizer® in the range of 18.81 mm (from 110.46 mm to 129.29 mm). The stability of the samples was as follows:

TABLE 1

| Sample and Weighting Agent | Weighting Agent in % of Oil Phase | Instability Index |
| --- | --- | --- |
| Control | 0 | 0.43 |
| Comparative: BVO | 12.2 | 0.35 |
| Comparative: SAIB | 12.2 | 0.39 |
| Comparative: GEWR | 12.2 | 0.42 |
| Inventive: $TiO_2$ | 6.1 | 0.12 |
| Inventive: $TiO_2$ | 3 | 0.22 |
| Inventive: $TiO_2$ | 1.2 | 0.28 |
| Inventive: $TiO_2$ | 0.12 | 0.38 |
| Inventive: $TiO_2$ | 0.06 | 0.40 |

As can be seen in Table 1, titanium dioxide ($TiO_2$) slowed the rate of creaming as compared to the Control. Specifically, $TiO_2$ outperformed BVO/SAIB/GEWR even when used at levels that were 10 times less than the levels of BVO/SAIB/GEWR used in their respective samples. The inventive samples including $TiO_2$ had similar stability to the comparative samples including BVO/SAIB/GEWR even when $TiO_2$ was present in the inventive samples in amounts that are 100 less than the amounts of BVO/SAID/BEWR present in the comparative samples.

Example 2

Creaming rates associated with the samples of Example 1, set at a 20% transmission threshold were measured in mm/day. The creaming rates of the samples was measured after running the samples in the LUMiSizer® as emulsion concentrates for 4980 seconds at approximately 970-980 g. The samples were measured by the LUMiSizer® in the range of 18.83 mm (from 110.67 mm to 129.5 mm).

For purposes of this application, a 20% threshold will be understood to mean that a sample allows 20% of light to pass through the sample and absorbs 80% of the light passing through the sample. This 20% transmission level is measured throughout the entire sample to calculate the creaming rate. For example, a faster creaming rate means that the sample will have a 20% light transmission for a shorter period of time and a slower creaming rate indicates that the sample will have 20% light transmission for a longer period of time.

TABLE 2

| Sample and Weighting Agent | Weighting Agent in % of Oil Phase | Creaming Rate mm/day at 970-980 g |
|---|---|---|
| Control | 0 | 252 |
| Comparative: BVO | 12.2 | 219 |
| Comparative: SAIB | 12.2 | 216 |
| Comparative: GEWR | 12.2 | 232 |
| Inventive: $TiO_2$ | 6.1 | 0 |
| Inventive: $TiO_2$ | 3 | 0 |
| Inventive: $TiO_2$ | 1.2 | 0 |
| Inventive: $TiO_2$ | 0.12 | 213 |
| Inventive: $TiO_2$ | 0.06 | 229 |

As can be seen in Table 2 above, the samples including 0.12% to 6.1% $TiO_2$ had lower creaming rates and higher stability than the samples including BVO/SAIB/GEWR. At a 20% transmission threshold, there was not enough creaming to measure a rate for 1.2 to 6.1% $TiO_2$ and the creaming rate was 0.

Example 3

The samples of Example 1 were diluted into a 10% Sucrose in Water solution (w/w) at a 1:9 ratio to simulate a typical drink reconstituted from a beverage concentrate. The instability index of the samples was measured after running the samples in the LUMiSizer® as emulsion concentrates for 4980 seconds at approximately 970-980 g. The samples were measured by the LUMiSizer® in the range of 18.91 mm (from 110.66 mm to 129.57 mm).

TABLE 3

| Sample and Weighting Agent | Weighting Agent in % of Oil Phase | Instability Index |
|---|---|---|
| Control | 0 | 0.65 |
| Comparative: BVO | 12.2 | 0.54 |
| Comparative: SAIB | 12.2 | 0.60 |
| Comparative: GEWR | 12.2 | n/a |
| Inventive: $TiO_2$ | 6.1 | 0.37 |
| Inventive: $TiO_2$ | 3 | 0.48 |
| Inventive: $TiO_2$ | 1.2 | 0.57 |
| Inventive: $TiO_2$ | 0.12 | 0.61 |
| Inventive: $TiO_2$ | 0.06 | 0.63 |

As can be seen in Table 3, all $TiO_2$ samples outperformed the Control. Further, $TiO_2$ samples containing one half and one quarter amount of $TiO_2$ as compared to the amounts of BVO and SAIB present in the BVO/SAIB containing samples outperformed the BVO/SAIB samples.

Example 4

The samples included stabilized modified food starch (Purity Gum Ultra) and castor oil emulsions with different weighting agents. The instability index of the samples was measured after running the samples in the LUMiSizer® as emulsion concentrates for 4980 seconds at approximately 970-980 g. The samples were measured by the LUMiSizer® in the range of 16.7 mm (from 113.2 mm to 129.9 mm). The stability of the samples was as follows:

TABLE 4

| Sample and Weighting Agent | Weighting Agent in % of Oil Phase | Instability Index |
|---|---|---|
| Control | 0 | 0.11 |
| Comparative: BVO | 12.2 | 0.03 |
| Comparative: SAIB | 12.2 | 0.02 |
| Comparative: GEWR | 12.2 | 0.06 |
| Inventive: $TiO_2$ | 6.1 | 0.01 |
| Inventive: $TiO_2$ | 3 | 0.03 |
| Inventive: $TiO_2$ | 1.2 | 0.04 |
| Inventive: $TiO_2$ | 0.12 | 0.10 |
| Inventive: $TiO_2$ | 0.06 | N/A |

Overall, $TiO_2$ slowed the rate of creaming compared to the Control. $TiO_2$ at 6.1% outperformed (i.e., resulted in a lower instability index than) BVO/SAIB/GEWR, which were present at 12.2% (i.e., double) concentration in their respective samples. Also, $TiO_2$ at 3% performed comparably to BVO at 12.2% and outperformed GEWR at 12.2%.

Example 5

Creaming rates associated with the samples of Example 4, set at a 20% transmission threshold were measured in mm/day. The creaming rates of the samples was measured after running the samples in the LUMiSizer® as emulsion concentrates for 4980 seconds at approximately 970-980 g. The samples were measured by the LUMiSizer® in the range of 17.41 mm (from 112 mm to 129.41 mm).

As can be seen in Table 5 below, overall, the $TiO_2$ samples outperformed (i.e., resulted in lower creaming rates than) the Control. $TiO_2$ at 3 to 6.1% outperformed the SAIB/GEWR-weighted samples and performed equally to BVO. At a 20% transmission threshold, there was not enough creaming to measure a rate for 3 & 6.1% $TiO_2$ and BVO Samples.

TABLE 5

| Sample and Weighting Agent | Weighting Agent in % of Oil Phase | Creaming Rate mm/day at 970-980 g |
|---|---|---|
| Control | 0 | 51 |
| Comparative: BVO | 12.2 | 0 |
| Comparative: SAIB | 12.2 | 28 |
| Comparative: GEWR | 12.2 | 42.8 |
| Inventive: $TiO_2$ | 6.1 | 0 |
| Inventive: $TiO_2$ | 3 | 0 |
| Inventive: $TiO_2$ | 1.2 | 36 |
| Inventive: $TiO_2$ | 0.12 | 50 |
| Inventive: $TiO_2$ | 0.06 | n/a |

Example 6

The samples included stabilized gum acacia and terpene hydrocarbon emulsions with different weighting agents. The instability index of the samples was measured after running the samples in the LUMiSizer® as emulsion concentrates for 4980 seconds at approximately 970-980 g. The samples were measured by the LUMiSizer® in the range of 16.35 mm (from 113.36 mm to 129.71 mm). The stability of the samples was as follows:

TABLE 6

| Sample and Weighting Agent | Ratio of Weighting Agent to Oil Phase | Instability Index |
|---|---|---|
| Control | Terpene Emulsion | 0.2550 |
| Comparative: BVO | Terpene Emulsion | 0.1086 |
| Comparative: SAIB | Terpene Emulsion | 0.1514 |
| Inventive: TiO$_2$ | 1:10 Terpene Emulsion | 0.1171 |
| Inventive: TiO$_2$ | 1:50 Terpene Emulsion | 0.1705 |
| Inventive: TiO$_2$ | 1:100 Terpene Emulsion | 0.1639 |

As can be seen in Table 6 above, the TiO$_2$, while used at lower levels than BVO and SAIB in their respective samples, performed similarly to the BVO and SAIB samples.

Example 7

A set of experiments was performed to determine whether the order of addition of TiO$_2$ affects the instability index. The instability index of the samples was measured after running the samples in the LUMiSizer® as emulsion concentrates for 4980 seconds at approximately 970-980 g. The samples were measured by the LUMiSizer® in the range of 18.4 mm (from 110.6 mm to 129 mm).

TABLE 7

| Ingredients and Conditions | Order Of Addition of TiO$_2$ | Instability Index |
|---|---|---|
| Castor Oil - ½ TiO2 - ½ Speed - Emulsion Concentrate | TiO$_2$ added to oil before emulsification | 0.1339 |
| Castor ½ TiO2 - Acacia 5 min at 50% | S TiO$_2$ added to oil simultaneously with emulsification | 0.1740 |
| Castor Oil - ¼ TiO2 - ½ Speed - Emulsion Concentrate | TiO$_2$ added to oil before emulsification | 0.2063 |
| Castor ¼ TiO2 - Acacia 5 min at 50% | S TiO$_2$ added to oil simultaneously with emulsification | 0.2921 |

Table 7 above shows that when TiO$_2$ is added to the water phase simultaneously with the oil, the instability index significantly goes up. It was observed that when TiO$_2$ was added to the water phase first, the instability index was also increased as compared to the samples where TiO$_2$ was blended in oil before emulsification.

Example 8

The samples included stabilized small molecule surfactants such as Polysorbate 60 (P60) and *Quillaja* extract and castor oil or medium chain triglycerides (MCT) emulsions with different weighting agents. The instability index of the samples was measured after running the samples in the LUMiSizer® as emulsion concentrates for 4980 seconds at approximately 970-980 g. The samples were measured by the LUMiSizer® in the range of 18.1 mm (from 110.9 mm to 129 mm). The stability of the samples was as follows:

TABLE 8

| Sample and Weighting Agent | Amount of TiO$_2$ | Instability Index |
|---|---|---|
| P60 + Castor Oil | None | 0.9065 |
| P60 + Castor Oil + TiO$_2$ | 0.15% | 0.9085 |
| P60 + MCT | None | 0.9469 |
| P60 + MCT + TiO$_2$ | 0.15% | 0.9488 |
| Quillaja + Castor Oil | None | 0.9072 |
| Quillaja + Castor Oil + TiO$_2$ | 0.15% | 0.8948 |
| MCT + Quillaja | None | 0.9573 |
| MCT + Quillaja + TiO$_2$ | 0.15% | 0.9156 |

As can be seen in Table 8, the use of TiO$_2$ with low molecular weight emulsifiers such as Polysorbate 60 and *Quillaja* extract failed to slow the creaming rate of the oil droplets as compared to the use of TiO2 with high molecular weight emulsifiers such as gum acacia and modified food starches.

The oil-in-water emulsions for drinkable beverages as described herein include a weighting agent encapsulated in oil droplets and the encapsulation of the weighting agent particles as described herein advantageously permits the weighting agent to decrease the density contrast between the oil droplets and the surrounding aqueous phase, thereby restricting the undesirable sedimentation or creaming of the oil particles. The weighting agents as described herein may be advantageously used in significantly lower amounts than conventional weighting agents and achieve the same or better protection against creaming.

It will be understood that various changes in the details, materials, and arrangements of the process, formulations, and ingredients thereof, which have been herein described and illustrated in order to explain the nature of the method and resulting concentrate, may be made by those skilled in the art within the principle and scope of the embodied method as expressed in the appended claims.

What is claimed is:

1. A beverage including an emulsion, the beverage comprising:
   a continuous aqueous phase including an emulsifier dissolved therein;
   an oil phase including oil droplets dispersed in the continuous aqueous phase; and
   a solid, oil-insoluble weighting agent encapsulated in the oil droplets;
   wherein a ratio of the solid weighting agent to the oil phase in the emulsion is from about 1:5 to about 1:2000; and
   wherein the solid weighting agent is titanium dioxide.

2. The beverage of claim 1, wherein the emulsion is an oil-in-water emulsion with an average size of the encapsulated oil droplets greater than about 100 nm.

3. The beverage of claim 1, wherein the oil droplets have an average size of about 100 nm to about 1500 nm.

4. The beverage of claim 1, wherein the ratio of the solid weighting agent to the oil phase is from about 1:3 to about 1:1,650.

5. The beverage of claim 1, wherein the solid weighting agent is present in the emulsion at about 0.0001 percent to about 0.3 percent by weight of the emulsion.

6. The beverage of claim 1, wherein the oil phase includes water insoluble lipids selected from the group consisting of castor oil, terpene hydrocarbons, flavor oils, ketones, aldehydes, lactones, ethers, esters, sulfur compounds, furanones, terpenoids, oil soluble vitamins, nutraceuticals, fatty acids, poly-unsaturated fatty acids, triglycerides and triglyceride derivatives, antioxidants, colorants, vegetable oils, and combinations thereof.

7. The beverage of claim 1, wherein the solid weighting agent has a density from about 1.0 g/ml to about 6.0 g/ml.

8. The beverage of claim 1, wherein the emulsifier has a molecular weight no less than about 50,000 Daltons.

9. The beverage of claim 1, wherein the emulsifier is selected from the group consisting of gum acacia, modified food starch, modified gum acacia, corn fiber gum, gum tragacanth, gum karaya, gum ghatti, and combinations thereof.

10. The beverage of claim 1, wherein a creaming rate of the emulsion is about 0 mm/day to about 5 mm/day mm/day at ambient storage.

* * * * *